Jan. 11, 1966 T. SCHAUG-PETTERSEN ETAL 3,229,193

PULSED FERRITE GENERATOR UTILIZED AS A FREQUENCY CONVERTER IN THE MICROWAVE OR MILLIMETER WAVE RANGE

Filed May 26, 1961

INVENTORS,
BRIAN JOHN ELLIOTT
TOR SCHAUG-PETTERSEN
BY HERBERT JOHN SHAW

Jack H. Linscott

ATTORNEY

United States Patent Office
3,229,193
Patented Jan. 11, 1966

3,229,193

PULSED FERRITE GENERATOR UTILIZED AS A FREQUENCY CONVERTER IN THE MICROWAVE OR MILLIMETER WAVE RANGE

Tor Schaug-Pettersen, Florvaag, Norway, and Brian John Elliott, Palo Alto, and Herbert John Shaw, Stanford, Calif., assignors to the United States of America as represented by the Secretary of the Army Filed May 26, 1961, Ser. No. 123,078
5 Claims. (Cl. 321—69)

This invention relates to pulsed ferrite generators and more particularly to pulsed ferrite generators for generating electric R-F energy having frequencies in the microwave range or the millimeter wave range.

This invention is related to the invention described in copending application, Serial No. 69,778 filed by Martin Stiglitz and Frederic R. Morgenthaler for: "Garnet Microwave Pulse Generator," on November 16, 1960, and assigned to the assignee of this invention. The copending application by Stiglitz and Morgenthaler issued as Patent No. 3,164,768 on January 5, 1965.

Prior art solid-state generators present many problems that are overcome by this invention. For example, the pulsed ferrite generators of this invention operate at room temperature and deliver more output power than can be obtained from the common maser generators. Furthermore, known pulsed ferrite generators are generally unstable and, like the maser generators, have low output power.

In accordance with the present invention a sphere of ferromagnetic material, or any other type of suitable gyromagnetic material, is subjected to a continuous D.C. magnetic field which aligns the electron spins of the sphere along the direction of the magnetic field. A microwave pump signal is then applied to the sphere, and the D.C. field is adjusted for resonance of the spin system at the pump frequency, so that uniform precession of the spin system is established. A pulsed D.C. magnetic field is then applied to the sphere in the same direction as the continuously applied field. The pulsed field increases the resonant frequency of the spin system and adds energy to the system. At this point the spin system no longer absorbs power from the pump signal. The pulsed field is so designed that its rise time is short compared to the internal relaxation time T of the ferromagnetic material, so that the spins precess freely at a frequency higher than the pump frequency when the pulsed field has reached its final value. A suitably designed microwave system damps the free precession in a time, also short in terms of T, and thus extracts the energy stored in the electron spins. The stored energy is extracted in the form of a pulse of coherent radiation at a frequency higher than the pump frequency. The frequency of the output energy can be readily determined, and is dependent upon the combined strength of the continuous field and the pulsed field.

It is therefore an object of this invention to provide a ferrite type generator.

Another object of this invention is to provide a microwave generator.

A further object of this invention is to provide a millimeter wave generator.

A still further object of this invention is to provide a frequency converter.

The above mentioned and other objects will become more apparent from the following detailed description, particularly when taken in connection with the accompanying drawings wherein.

Figure 1:
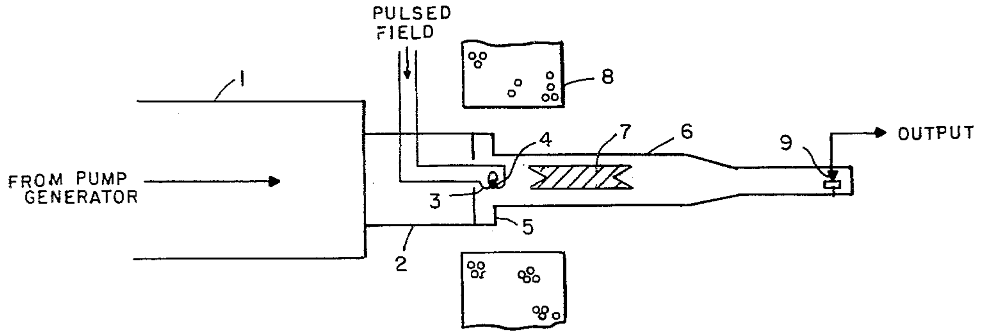
FIG. 1 shows a novel generator in accordance with this invention.

Referring now to FIG. 1, the apparatus shown is a so-called straight-through, non-resonant type circuit. The pump signal is coupled to ferrite sphere 4 by means of circular wave-guide 1 and stripline 2. Output signals are extracted from ferrite sphere 4 by means of circular waveguide 6. The dimensions of guides 1, 2 and 6 are determined by the frequency of the input and output signals, respectively. Output guide 6 ends in choke 5 and contains a circular polarizer 7. The purpose of choke 5 is to prevent the R-F energy radiated by ferrite 4 from reaching the input waveguide so that all of the energy from the ferrite will travel along output guide 6 to the load. The choke is so designed that it presents virtually an open circuit in the vicinity of the end of output guide 6, and ferrite 4 is placed approximately one-quarter wavelength from the equivalent open circuit plane. Due to the frequency difference between the pump signal and the output signal, the pump frequency will not propagate into choke 5, and leakage fields are relied upon to couple the pump input to ferrite 4. Thus, choke 5 isolates the pump input from output guide 6 and assures maximum transfer of output energy to detector 9. A continuous D.C. field is applied to ferrite 4 by means of coil 8, and a pulsed D.C. field is applied to the ferrite by means of single loop coil 3.

The circuit of FIG. 1 operates substantially as described above for the invention in general. That is, the pump signal is coupled to ferrite 4 and the continuous D.C. field applied by coil 8 is adjusted for resonance of the spin system of the ferrite 4 at the pump frequency. A pulsed D.C. field is then applied to ferrite 4 and the energy stored in the spin system is extracted by output guide 6. This process is repeated periodically at any suitable repetition rate. As has been previously mentioned, the output frequency is higher than the pump frequency. The frequency of the output signal is determined by the combined strength of the continuous and pulsed fields. Thus, if means are available for generating large field strengths an exceptionally large frequency conversion can be obtained. For example, if the pump signal frequency is in the S-band, the output signal may be in the K-band. Also, the pump signal and the output signal are not necessarily harmonically related.

Figure 2:
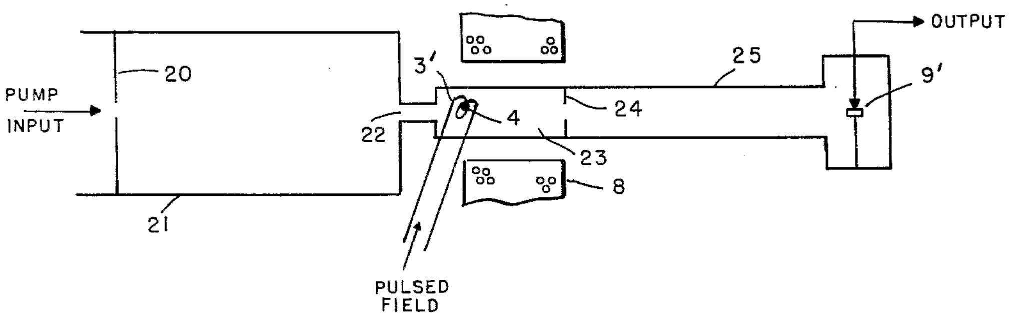
FIG. 2 shows another embodiment of this invention.

Referring now to FIG. 2, the circuit of FIG. 2 is similar to that of FIG. 1, except that it is a resonant type circuit rather than a non-resonant type. In this circuit pump signals are applied to ferrite 4 through coupling iris 20, waveguide resonator 21, and coupling aperture 22. Ferrite 4 is placed in output resonator 23, and output signals are coupled to detector 9$^1$ through iris 24 and output waveguide 25. The continuous field is again applied to ferrite 4 by coil 8 and the pulsed field is applied by means of single turn coil 3$^1$.

The circuit of FIG. 2 operates in the same manner as FIG. 1; however, in place of choke 5 output waveguide resonator 23 is used. Resonator 23 is resonant at the output frequency. Thus, when the pulsed field is applied to ferrite 4 no energy is coupled to the output waveguide until the spin system resonance frequency of the ferrite is equal to the desired output frequency. Also, resonator 23 prevents coupling of the pump signal to output guide 25.

Figure 3:
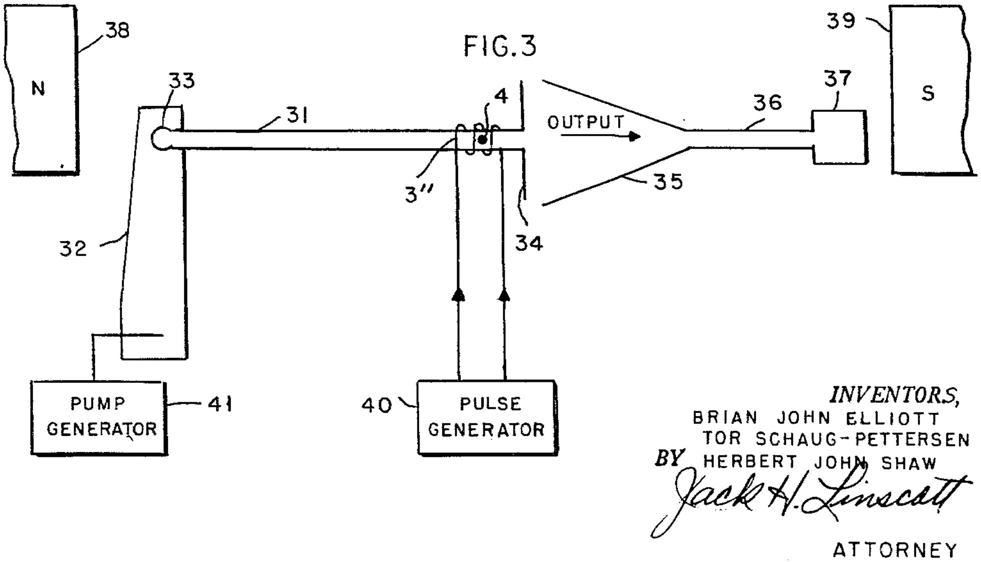
FIG. 3 shows a third embodiment of this invention.

The generator shown in FIG. 3 utilizes an open parallel wire transmission line.

Ferrite 4 is placed between the parallel wires of transmission lines 31, and pump signals are applied to the ferrite by pump generator 41 through tapered shorted guide 32 and coupling loop 33. Output power from ferrite 4 travels toward the output end of line 31 where it is radiated by dipole antenna 34 into a receiving horn 35. The receiving horn is coupled to detector 37 by means of waveguide 36. Horn 35 and waveguide 36 act as a filter that rejects all but the desired output frequency. A continuous D.C. field is applied to ferrite 4 by any suitable means. In FIG. 3 north and south poles 38 and 39 are used to indicate the magnetic system for the continuous field applied to ferrite 4. A pulsed field is applied to ferrite 4 by coil 3[11] from generator 40. The operation of this parallel wire system is the same as the operation of the systems of FIGS. 1 and 2.

From the foregoing description the advantages of this invention should be apparent; however, to better understand its operation and advantages the following example of operating parameters is given for purposes of illustration only:

Pump frequency=2.4 kmc.
Maximum pump power=1 watt
Continuous field=860 gauss
Pulsed field=140 gauss
Output frequency=2.8 kmc.
Output power=1 watt
Ferrimagnetic material: yttrium iron garnet The above values are by no means limiting values. In fact, a much larger frequency conversion is possible. As was stated before, the conversion is controlled by the pulsed field. Thus, theoretically any desired frequency gain is possible if a strong enough pulsed field can be obtained. Of course, from a practical standpoint many factors limit the frequency gain that can be obtained. However, it is practically possible to obtain output pulses having a frequency in the millimeter range as well as output pulses having a frequency in the microwave range.

It is now apparent that the generators of this invention provide high frequency gain, and comparatively high output power. Furthermore, the generators are relatively simple in structure and operate at room temperature.

This invention can be embodied in a multiplicity of forms and is not limited in any way to the forms illustrated, nor the operating parameters given. Its scope is to be limited only by the limitations set forth in the following claims.

What is claimed is:

1. A signal generator comprising: an input waveguide; means for applying a pump signal to said waveguide; a stripline guide coupled to said input waveguide; an output waveguide; a choke coupled between said stripline guide and said output waveguide; a sphere of gyromagnetic material placed within said output waveguide; means magnetically coupled to said material for applying a continuous D.C. field to said material; a single turn coil magnetically coupled to said material; and means connected to said coil for applying a pulsed D.C. field to said material.

2. A signal generator comprising: an input waveguide; means for applying a pump signal to said input waveguide; a stripline guide coupled to said input waveguide; an output waveguide; a choke for coupling said stripline guide to said output waveguide; a sphere of gyromagnetic material located within said output waveguide, said gyromagnetic material being located at the end of said output waveguide that is adjacent said choke; means magnetically coupled to said material for applying a continuous D.C. field to said material; means magnetically coupled to said material for applying a pulsed D.C. field to said material; and means for extracting output signals from said output waveguide.

3. A signal generator according to claim 2 wherein said means for extracting output signals from said output waveguide is a diode located within said output waveguide.

4. A signal generator according to claim 3 wherein said means for applying a pulsed D.C. field is a single turn coil.

5. A signal generator according to claim 4 wherein a circular polarizer is placed within said output waveguide between said gyromagnetic material and said diode.

References Cited by the Examiner

UNITED STATES PATENTS

| | | | |
|---|---|---|---|
| 2,923,882 | 2/1960 | Bradford | 321—69 |
| 2,958,045 | 10/1960 | Anderson | 321—69 |
| 2,978,649 | 4/1961 | Weiss | 321—69 |
| 3,164,768 | 1/1965 | Stiglitz et al. | 321—69 |

FOREIGN PATENTS

| | | |
|---|---|---|
| 833,130 | 4/1960 | Great Britain. |

OTHER REFERENCES

1957, IRE Wescon Convention Record, Part I, Mixing in Ferrites at Microwave Frequencies, pp. 52–57.

Journal of Applied Physics, vol. 29, No. 3, March 1958, Spin-Lattice Relaxation Time in Yttrium Iron Garnet, p. 425.

Proceedings of the IRE, February 1960, Ferromagnetic Amplifiers, p. 259.

Proceedings of the IRE, May 1960, Ferromagnetic Amplifier Using Longitudinal Pumping, pp. 937–938.

LLOYD McCOLLUM, *Primary Examiner.*

SAMUEL BERNSTEIN, *Examiner.*

G. J. BUDOCK, G. GOLDBERG, J. J. KISSANE, *Assistant Examiners.*